(12) United States Patent
Ribeiro Dias et al.

(10) Patent No.: US 12,576,631 B1
(45) Date of Patent: Mar. 17, 2026

(54) DELAMINATION OF USED SOLAR MODULE

(71) Applicant: SOLARCYCLE, Inc., Odessa, TX (US)

(72) Inventors: Pablo Ribeiro Dias, Odessa, TX (US); Priscila Silva Silveira Camargo, Odessa, TX (US)

(73) Assignee: SOLARCYCLE, INC., Mesa, AZ (US)

( * ) Notice: Subject to any disclaimer, the term of this patent is extended or adjusted under 35 U.S.C. 154(b) by 133 days.

(21) Appl. No.: 18/409,600

(22) Filed: Jan. 10, 2024

Related U.S. Application Data

(60) Provisional application No. 63/479,527, filed on Jan. 11, 2023.

(51) Int. Cl.
    *B32B 43/00* (2006.01)
    *B23B 35/00* (2006.01)
    (Continued)

(52) U.S. Cl.
    CPC ............ *B32B 43/006* (2013.01); *B23B 35/00* (2013.01); *B32B 9/045* (2013.01); *B32B 15/082* (2013.01); *B32B 17/061* (2013.01); *B32B 2311/08* (2013.01); *B32B 2311/12* (2013.01); *B32B 2315/08* (2013.01); *B32B 2329/06* (2013.01); *B32B 2331/04* (2013.01);
    (Continued)

(58) Field of Classification Search
    CPC ............. B32B 43/006; Y10T 156/1184; Y10T 156/1967; Y10S 156/922; Y10S 156/937
    See application file for complete search history.

(56) References Cited

U.S. PATENT DOCUMENTS 3,596,413  A    8/1971  Stewart
4,309,204  A    1/1982  Brooks
                (Continued)

FOREIGN PATENT DOCUMENTS

AU       2021904167      12/2021
BR     1020160250978      6/2020
                (Continued)

OTHER PUBLICATIONS

M. Wagar Akram et al. "CNN based automatic detection of photovoltaic cell defects in electroluminescence images", ScienceDirect, Dec. 2019, vol. 189. pp. 1-8.
                (Continued)

*Primary Examiner* — Philip C Tucker
*Assistant Examiner* — Nickolas R Harm

(57) ABSTRACT

Delamination of a solar module (for, e.g., purposes of recycling) may be achieved by applying a rotating member(s) against surface(s) of a used solar module. In certain embodiments, the rotating member may comprise a straight router bit, which may be applied under computer control. Successive application of rotating member(s) at different heights, may afford the collection of different materials. According to one particular embodiment, a rotating router bit may be applied first against a polymer backsheet, and then at a different height against other materials comprising metals and PV material such as crystalline silicon. Collection of resulting fractions produced by delamination at different heights, can produce material (e.g., metals, silicon) of relatively high purity and suitable for reuse.

18 Claims, 7 Drawing Sheets

(51) Int. Cl.
  *B32B 9/04* (2006.01)
  *B32B 15/082* (2006.01)
  *B32B 17/06* (2006.01)

(52) U.S. Cl.
  CPC ....... *B32B 2383/00* (2013.01); *B32B 2457/12* (2013.01); *Y10S 156/922* (2013.01); *Y10S 156/937* (2013.01); *Y10T 156/1184* (2015.01); *Y10T 156/1967* (2015.01)

(56) References Cited

U.S. PATENT DOCUMENTS

| | | |
|---|---|---|
| 5,334,844 A | 8/1994 | Pollard et al. |
| 5,779,877 A | 7/1998 | Drinkard, Jr. et al. |
| 6,063,995 A | 5/2000 | Bohland et al. |
| 6,111,638 A | 8/2000 | Chou et al. |
| 6,129,779 A | 10/2000 | Bohland et al. |
| 6,294,724 B1 | 9/2001 | Sasaoka et al. |
| 6,781,344 B1 | 8/2004 | Hedegor et al. |
| 6,902,604 B2 | 6/2005 | Heckel et al. |
| 7,105,041 B2 | 9/2006 | Dunn |
| 7,731,920 B2 | 6/2010 | Fthenakis et al. |
| 8,448,318 B2 | 5/2013 | Murphy |
| 10,092,907 B2 | 10/2018 | Mankosa et al. |
| 10,385,421 B2 | 8/2019 | Tao et al. |
| 10,913,072 B2 | 2/2021 | Lee et al. |
| 11,491,774 B1 | 11/2022 | Lee et al. |
| 12,005,485 B2 | 6/2024 | Ribeiro Dias et al. |
| 2002/0030035 A1 | 3/2002 | Dieguez et al. |
| 2002/0189977 A1 | 12/2002 | Maehata et al. |
| 2005/0051204 A1 | 3/2005 | Oi et al. |
| 2007/0189435 A1 | 8/2007 | Tani et al. |
| 2008/0105294 A1 | 5/2008 | Kushiya et al. |
| 2010/0236035 A1 | 9/2010 | Chung |
| 2011/0069313 A1 | 3/2011 | Sakai et al. |
| 2012/0325676 A1 | 12/2012 | Taylor et al. |
| 2014/0000316 A1 | 1/2014 | Coggin |
| 2016/0103015 A1 | 4/2016 | Ichihashi |
| 2016/0109630 A1 | 4/2016 | Ichihashi |
| 2016/0154156 A1 | 6/2016 | Ichihashi et al. |
| 2018/0254364 A1* | 9/2018 | Kawanishi .............. H10F 19/80 |
| 2019/0371951 A1 | 12/2019 | Sumida |
| 2020/0148585 A1 | 5/2020 | Nakano et al. |
| 2020/0181376 A1 | 6/2020 | Hellstrom et al. |
| 2020/0198316 A1* | 6/2020 | Coustier ................ B26D 3/281 |
| 2020/0238679 A1 | 7/2020 | Kernbaum et al. |
| 2020/0247106 A1 | 8/2020 | Lee et al. |
| 2020/0282432 A1 | 9/2020 | Khadilkar |
| 2021/0263181 A1 | 8/2021 | Jukkola et al. |
| 2021/0287357 A1 | 9/2021 | Horowitz et al. |
| 2022/0140175 A1 | 5/2022 | Matsumoto et al. |
| 2022/0184939 A1 | 6/2022 | Kim |
| 2022/0195139 A1 | 6/2022 | Sakumoto |
| 2022/0199843 A1* | 6/2022 | Andreatta ............. H01L 21/465 |
| 2022/0363047 A1 | 11/2022 | Kim |
| 2023/0019898 A1 | 1/2023 | Lee et al. |
| 2023/0116994 A1 | 4/2023 | Tahata et al. |
| 2023/0339001 A1 | 10/2023 | Miyako |
| 2023/0339003 A1 | 10/2023 | Ribeiro Dias et al. |
| 2023/0343654 A1 | 10/2023 | Ribeiro Dias et al. |
| 2023/0405652 A1 | 12/2023 | Ribeiro Dias et al. |
| 2024/0042503 A1 | 2/2024 | Brandhorst, Jr. et al. |
| 2024/0123479 A1 | 4/2024 | Fu et al. |
| 2024/0181511 A1 | 6/2024 | Ribeiro Dias et al. |
| 2024/0246090 A1 | 7/2024 | Ribeiro Dias et al. |
| 2024/0351050 A1 | 10/2024 | Ribeiro Dias |
| 2024/0383022 A1 | 11/2024 | Ribeiro Dias et al. |
| 2024/0391139 A1 | 11/2024 | Groppo et al. |
| 2025/0115042 A1 | 4/2025 | Veettil et al. |

FOREIGN PATENT DOCUMENTS

| | | |
|---|---|---|
| BR | 1020200124161 | 6/2020 |
| CN | 202555405 | 11/2012 |
| CN | 102953081 A | 3/2013 |
| CN | 103978021 B | 8/2014 |
| CN | 105618461 A | 6/2016 |
| CN | 106629738 | 5/2017 |
| CN | 106834700 A | 6/2017 |
| CN | 110404920 A | 11/2019 |
| CN | 209929333 | 1/2020 |
| CN | 111604349 | 9/2020 |
| CN | 111804716 | 10/2020 |
| CN | 113215412 A | 8/2021 |
| CN | 115358968 A | 11/2022 |
| DE | 4300870 A1 | 7/1994 |
| DE | 102021129301 | 1/2023 |
| EP | 279200 | 8/1988 |
| EP | 1830411 A1 | 9/2007 |
| EP | 2997169 | 3/2016 |
| EP | 4169619 A1 | 4/2023 |
| FR | 3096833 A1 | 3/2022 |
| FR | 3140289 A1 | 4/2024 |
| GB | 2300827 A | 11/1996 |
| JP | 2004186547 A | 7/2004 |
| JP | 2007059793 | 3/2007 |
| JP | 2011173099 | 9/2011 |
| JP | 2014054593 | 3/2014 |
| JP | 2014104406 | 6/2014 |
| JP | 2016036756 A | 3/2016 |
| JP | 2017-006839 A | 1/2017 |
| JP | 2018021774 A | 2/2018 |
| JP | 2018086651 | 6/2018 |
| JP | 2020-192507 | 12/2020 |
| KR | 10-2013-0060708 | 6/2013 |
| KR | 20130104794 A | 9/2013 |
| KR | 101842224 | 3/2018 |
| KR | 10-2020-0095749 | 8/2020 |
| KR | 102258669 B1 | 6/2021 |
| KR | 102283519 B1 | 7/2021 |
| KR | 1020210082629 | 7/2021 |
| KR | 1020210083721 A | 7/2021 |
| KR | 10-2303527 | 9/2021 |
| KR | 10-2337586 | 12/2021 |
| KR | 20220026695 A | 3/2022 |
| KR | 1020230058924 A | 5/2023 |
| KR | 10-2589354 | 10/2023 |
| WO | 2005024854 | 3/2005 |
| WO | 2006130715 A3 | 12/2006 |
| WO | 2012083398 | 6/2012 |
| WO | 2013057035 | 4/2013 |
| WO | 2017100443 | 6/2017 |
| WO | 2018039146 | 3/2018 |
| WO | 2018218358 A1 | 12/2018 |
| WO | 2019122567 A1 | 6/2019 |
| WO | 2021149545 | 7/2021 |
| WO | PCT/AU2022/051545 | 12/2022 |
| WO | 2023150831 | 8/2023 |
| WO | 2024069242 A1 | 4/2024 |

OTHER PUBLICATIONS

S. Prabhakaran et al. "Deep Learning-Based Model for Defect Detection and Localization on Photovoltaic Panels", Computer Systems Science & Engineering, 2022, pp. 1-18.

Xiaolong Zhao et al. "HRNet-based automatic identification of photovoltaic module defects using electroluminescence images", ScienceDirect, Mar. 2023, vol. 267, pp. 1-7.

Sharmarke Hassan et al. "Dual spin max pooling convolutional neural network for solar cell crack detection", Scientific reports, 2023, pp. 1-16, www.nature.com/scientificreports, https://doi.org/10.1038/s41598-023-38177-8.

Fatma Mazen et al. "Deep Learning for Automatic Defect Detection in PV Modules using Electroluminescence Images", IEEE Access, 2023, vol. 11, p. 57783-57795.

Jinxia Zhang et al. "A lightweight network for photovoltaic cell defect detection in electroluminescence images of heterojunction solar cells", arXiv:2302.07455v, Feb. 2023, pp. 1-12.

Alexey Korovin et al. "Anomaly detection in electroluminescence images of heterojunction solar cells" ScienceDirect, 2023, vol. 259, p. 130-136.

(56)                   References Cited

OTHER PUBLICATIONS

Aidong Chen et al. "Anomaly Detection Algorithm for Photovoltaic Cells Based on Lightweight Multi-Channel Spatial Attention Mechanism", Energies, 2023, pp. 1-15, vol. 16, Issue 4.

Samuel G. Muller et al. "TrivialAugment: Tuning-free Yet State-of-the-Art Data Augmentation", In Proceedings of the IEEE/CVF international conference on computer vision, 2021, pp. 774-782.

Alexey Dosovitsky et al. "An image is worth 16x16 words Transformers for image recognition at scale", Published as a conference paper at ICLR, 2021, pp. 1-22.

Ilya Loshchilov et al. "Decoupled Weight Decay Regularization", Published as a conference paper at ICLR, 2019, pp. 1-8, Freiburg, Germany.

Haiyong Chen et al. "Solar cell surface defect inspection based on multispectral convolutional neural network", Journal of Intelligent Manufacturing, 2020, vol. 31, p. 1-14.

Chalaux, Recycled Silicon for Chlorosilane Production, ROSI, Evonik, Sep. 11, 2024, 15 pgs., www.rosi-solar.com, www.evonik.com.

Ribeiro et al., Delamination of Used Solar Module, Utility Patent Application filed Jan. 10, 2024, 35 pgs., Utility U.S. Appl. No. 18/409,600.

Kice, "Multi-Aspirator for particle density separation", Kice Industries, 2023, 5 pgs., Park City, KS, https://www.kice.com/product-specs/multi-aspirator-for-particle-density-separation/.

Wang et al., Deep-Learning-Based Automatic Detection of Photovoltaic Cell Defects in Electroluminescence Images, Sensors, MDPI, Dec. 27, 2022, pp. 1-21, https://doi.org/10.3390/s23010297, Basel, Switzerland.

Dag Lindholm et al., "Thermomechanical Fatigue of Solder Joint and Interconnect Ribbon: Impact of Low Lamination Temperature"; Conference Paper, 38th European Photovoltaic Solar Energy Conference and Exhibition, Research Gate, Mar. 3, 2022, pp. 622-626, DOI: 10.4229/EUPVSEC20212021-4BO.5.4.

Nils Klasen et al., "Quantitative Evaluation of the Shading Resilience of PV Modules" Conference Paper, Fraunhofer-Gesellschaft, 38th European Photovoltaic Solar Energy Conference and Exhibition, EU PVSEC, Dec. 2020, 8 pgs., 10.24406/publica-r-412445.

Hodor et al.,, "Infrared Technology Comes to State-of-the-Art Solar Array Production" SPIE vol. 819, Infrared Technology XIII, Nov. 10, 1987, pp. 22-29, https://doi.org/10.1117/12.941797.

Solar Panel Recycling Service NPC Incorporated. https://www.npcgroup.net/eng/solarpower/reuse-recycle/recycle-service, 2022.

Joel Spaes. "New delamination technique for PV module recycling" Pv Magazine International. https://www.pvmagazine.com/2021/03/19/new-delamination-technique-for-pv-module-recycling/, 2021.

Manzil. "Hanging Solar Chargers" Trend Hunter Inc. https://www.trendhunter.com/trends/sunbox-solar-panels, 2010.

Mystery of Prince Rupert's Drop at 130,000 fps—Smarter Every Day 86 YouTube. https://www.youtube.com/watch?v=xe-f4gokRBs, 2013.

The Action Lab. "This Light Lets You See The Strength Of An Object" YouTube. https://www.youtube.com/watch?v=jFwm3TIC750, 2021.

Marianna Ottoni et al. "A circular approach to the e-waste valorization through urban mining in Rio de Janeiro, Brazil" Journal of Cleaner Production, 2020, vol. 261. https://doi.org/10.1016/j.jclepro.2020.120990.

Rong Deng et al. "A sustainable chemical process to recycle end-of-life silicon solar cells" Green Chemistry, 2021, vol. 23, Issue 24, pp. 10157-10167. https://doi.org/10.1039/d1gc02263f.

Pablo Dias et al. "Carbon emissions and embodied energy as tools for evaluating environmental aspects of tap water and bottled water in Brazil". Desalination and Water Treatment, 2015, vol. 57, Issue 28, pp. 13020-13029. https://doi.org/10.1080/19443994.2015.1055815.

Pablo Dias et al. "Recycling Crystalline Silicon Photovoltaic Modules". Emerging Photovoltaic Materials, 2019, vol. 57, pp. 61-102. https://doi.org/10.1002/9781119407690.ch3.

Pablo Dias et al. "Comprehensive recycling of silicon photovoltaic modules incorporating organic solvent delamination—technical, environmental and economic analyses". Resources, Conservation and Recycling, 2021, vol. 165. https://doi.org/10.1016/j.resconrec.2020.105241.

Marcelo Pilotto Cenci et al. "Eco-Friendly Electronics—A Comprehensive Review". Advanced Materials Technologies. https://doi.org/10.1002/admt.202001263, 2021.

Michael Eisenstein. "Upgrading the electronics ecosystem". The circular economy. Springer Nature Limited., 2022, pp. 8-10, vol. 611.

Pablo Dias et al. "Electronic waste in Brazil: Generation, collection, recycling and the covid pandemic". Cleaner Waste Systems, 3, 100022. https://doi.org/10.1016/j.clwas.2022.100022, 2022.

Pablo Dias et al. "Ensuring best E-waste recycling practices in developed countries: An Australian example". Journal of Cleaner Production, 2019, pp. 846-854. https://doi.org/10.1016/j.jclepro.2018.10.306.

Pablo Dias et al. "High yield, low cost, environmentally friendly process to recycle silicon solar panels: Technical, economic and environmental feasibility assessment". Renewable and Sustainable Energy Reviews. https://doi.org/10.1016/j.rser.2022.112900, 2022.

Verity Tan et al. "Estimating the Lifetime of Solar Photovoltaic Modules in Australia". Sustainability. https://doi.org/10.3390/su14095336, 2022.

Pablo Dias et al. "Lead hazard evaluation for cathode ray tube monitors in Brazil". Brazilian Journal of Chemical Engineering, 2018, vol. 35, pp. 43-49. https://doi.org/10.1590/0104-6632.20180351s20160367.

Pablo Dias et al. "Photovoltaic solar panels of crystalline silicon: Characterization and separation". Waste Management & Research: The Journal for a Sustainable Circular Economy, 2016, vol. 34(3), pp. 235-245. https://doi.org/10.1177/0734242x15622812.

Priscila Silva Silveira Camaargo et al. "Photovoltaic Module Recycling: Thermal Treatment To Degrade Polymers and Concentrate Valuable Metals". Detritus, 2021, vol. 16, pp. 48-62. https://doi.org/10.31025/2611-4135/2021.15119.

Pablo Dias et al. "Recycling Waste Crystalline Silicon Photovoltaic Modules by Electrostatic Separation". Journal of Sustainable Metallurgy, 2018, pp. 176-186, https://doi.org/10.1007/s40831-018-0173-5.

Pablo Dias et al. "Recycling WEEE: Extraction and concentration of silver from waste crystalline silicon photovoltaic modules". Waste Management, 2016, vol. 57, pp. 220-225. https://doi.org/10.1016/j.wasman.2016.03.016.

Pablo Dias et al. "Recycling WEEE: Polymer characterization and pyrolysis study for waste of crystalline silicon photovoltaic modules". Waste Management, 2017, vol. 60, pp. 716-722. https://doi.org/10.1016/j.wasman.2016.08.036.

Rong Deng et al. "Remanufacturing end-of-life silicon photovoltaics: Feasibility and viability analysis". Progress in Photovoltaics: Research and Applications, 2020, pp. 760-774, https://doi.org/10.1002/pip.3376.

Alison Lennon et al. "The aluminium demand risk of terawatt photovoltaics for net zero emissions by 2050". Nature Sustainability, 2022, pp. 357-363, https://doi.org/10.1038/s41893-021-00838-9.

Brett Hallam et al. "The silver learning curve for photovoltaics and projected silver demand for net-zero emissions by 2050". Progress in Photovoltaics: Research and Applications, 2022, https://doi.org/10.1002/pip.3661.

Pablo Dias et al. "Waste electric and electronic equipment (WEEE) management: A study on the Brazilian recycling routes". Journal of Cleaner Production, 2018, pp. 7-16. https://doi.org/10.1016/j.jclepro.2017.10.219.

Pablo Dias et al. "Waste electrical and electronic equipment (WEEE) management: An analysis on the australian e-waste recycling scheme". Journal of Cleaner Production, 2018, pp. 750-764. https://doi.org/10.1016/j.jclepro.2018.06.161.

Md Tasbirul ISLAM et al. "Waste mobile phones: A survey and analysis of the awareness, consumption and disposal behavior of consumers in Australia". Journal of Environmental Management, 2020, https://doi.org/10.1016/j.jenvman.2020.111111.

(56)  References Cited

OTHER PUBLICATIONS

Pablo Dias et al. "What drives WEEE recycling? A comparative study concerning legislation, collection and recycling". Waste Management & Research: The Journal for a Sustainable Circular Economy, 2022, https://doi.org/10.1177/0734242x221081660.

Md Tasbirul Islam et al. "Young consumers' e-waste awareness, consumption, disposal, and recycling behavior: A case study of university students in Sydney, Australia". Journal of Cleaner Production, 2021, https://doi.org/10.1016/j.jclepro.2020.124490.

A. Krummenauer et al. "Determining the LOD and LOQ in steel alloys analysis using NITON spectrometer", Journal of Physics: Conference Series, 2021, https://doi.org/10.1088/1742-6596/1826/1/012008.

A. Krummenauer et al. "Estimation of measurement uncertainty in the EDXRF spectrometry of stainless steel", Journal of Physics: Conference Series, 2021, https://doi.org/10.1088/1742-6596/1826/1/012011.

Md Tasbirul Islam et al. "Comparison of E-Waste Management in Switzerland and in Australia: A Qualitative Content Analysis." World Academy of Science, Engineering and Technology International Journal of Environmental and Ecological Engineering, 2018, pp. 610-616.

P.R. Dias. "Recycling waste solar modules using organic solvents." http://uest.ntua.gr/heraklion2019/proceedings/pdf/74_HERAKLION%202019_Dias_etal.pdf. 2020, pp. 21-24.

T. M. Bruton et al. "Re-Cycling of High Value, High Energy Content Components of Silicon PV Modules", 12th European Photovoltaic Solar Energy Conference, 1994, pp. 302-305, Amsterdam, The Netherlands.

Valeria Fiandra et al. "Silicon photovoltaic modules at end-of-life: Removal of polymeric layers and separation of materials", Waste Management, 2019, pp. 97-107, vol. 87, Italy.

Cynthia Latunussa et al. "Life Cycle Assessment of an innovative recycling process for crystalline silicon photovoltaic panels", Solar Energy Materials & Solar Cells, 2016, pp. 101-111, vol. 156, Italy.

Dion Thompson "Thermal Treatment of End of Life PV Modules", School of Photovoltaic and Renewable Energy Engineering Faculty of Engineering, The University of New South Wales, Nov. 25, 2019.

Priscila Silva Silveira Camargo, ""Recycling of Crystalline Silicon Photovoltaic Modules: Separation and Concentration of Materials"", Universidade Federal Do Rio Grande Do Sul School of Engineering Dissertation, May 2021, pp. 1-168, Porto Alegre, Brazil.

Priscila Silva Silveira Camargo et al., "c-Si PV Module Recycling: Analysis of the use of a Mechanical Pretreatment to Reduce the Environmental Impact of Thermal Treatment and Enhance Materials Recovery," Waste Management & Research: The Journal for a Sustainable Circular Economy, Jun. 10, 2023, pp. 1-126, http://mc.manuscriptcentral.com/wmr.

Zisheng Zhang et al. "Electrostatic separation for recycling silver, silicon and polyethylene terephthalate from waste photovoltaic cells", Modern Physics Letters B, World Scientific 2017, Abstract page, vol. 31, Issue 11, https://doi.org/10.1142/S0217984917500877.

Keith Burrows et al., "Glass needs for a Growing Photovoltaics Industry", Solar Energy Materials and Solar Cells, Jan. 2015, p. 1-13, vol. 132.

Archivist, "Saint-Gobain Produces the First Zero-Carbon Flat Glass", Energy & Environment Jun. 2022, USGlass Magazine & USGNN Headline News, Jun. 27, 2022.

Eckersley O'Callaghan, "Climate Friday | Glass—The recyclable material we're not recycling", EOC Engineers, Jul. 14, 2021.

Brendan Wright et al., "Machine learning-powered module end-of-life decisions from luminescence images", Asia-Pacific Solar Research Conference, Nov.-Dec. 2022, 4 pgs., Newcastle, Australia.

Brendan Wright et al. "Machine learning-powered module end-of-life decision making based on luminescence images", Nov. 14, 2022, 1 pg., The University of New South Wales, Sydney, Australia.

Matthias Demant et al. "Micro-Cracks in Silicon Wafers and Solar Cells Detection and Rating of Mechanical Strength and Electrical Quality", In Proceedings of the 29th Solar Energy Conference and Exhibition, 2014, p. 390-396.

Matthias Demant et al. "Microcracks in Silicon Wafers I: Inline Detection and Implications of Crack Morphology on Wafer Strength", IEEE Journal of Photovoltaics, Jan. 2016, pp. 126-135, vol. 6, No. 1.

Matthias Demant et al. "Deep Learning Approach To Inline Quality Rating and Mapping of Multi Crystalline Si-Wafers", In Proceedings of the 35th European Photovoltaic Solar Energy Conference and Exhibition, Sep. 2018, p. 814-818, Brussels, Belgium.

Sachin Mehta et al. "Deepsolareye Power Loss Prediction and Weakly Supervised Soiling Localization via Fully Convolutional Networks for Solar Panels", arXiv:1710.03811v1, Oct. 2017, pp. 333-342.

* cited by examiner

PV LAMINATE

118

200

DELAMINATION OF USED SOLAR MODULE

CROSS-REFERENCE TO RELATED APPLICATION

The instant nonprovisional patent application claims priority to U.S. Provisional Patent Application No. 63/479,527, filed Jan. 11, 2023 and incorporated by reference in its entirety herein for all purposes.

BACKGROUND

As world population increases, the earth is subjected to escalating environmental stress. One form of stress is manifest in rising global temperatures attributable to the burning of fossil fuels in order to provide energy needs.

Alternative energy sources can provide power, while lessening the carbon dioxide burden on the planet. One important source of alternative energy is solar power.

Solar modules are complex manufactured items. They harness the sun's energy and convert it into a usable energy source for residential, commercial and utility-scale applications. As the climate has been significantly impacted by the use of fossil fuels over the past century, the need for alternative sources of energy like solar has taken on greater importance.

Another form of environmental stress imposed upon the earth, is the accumulation and disposal of waste products from human activity. Accordingly, rather than discarding a solar module at the end of its lifetime, it may be desirable to recycle material(s) from a solar module for reuse and thereby avoid deposition in a landfill.

SUMMARY

In connection with solar module recycling, embodiments apply rotating member(s) against surface(s) of a used solar module to effect delamination. In certain embodiments, the rotating member may comprise a straight router bit, which may be applied under computer control. Successive application of rotating member(s) at different heights, may afford the collection of different materials. According to one particular embodiment, a rotating router bit may be applied first against a polymer backsheet, and then at a different height against other materials comprising metals and PV material such as crystalline silicon. Collection of resulting fractions produced by delamination at different heights, can produce material (e.g., metals, silicon) of relatively high purity and suitable for reuse.

DESCRIPTION

Solar modules exist in a variety of types and architectures. Examples of such modules can include but are not limited to:

Monocrystalline Solar Panels (Mono-SI)

Polycrystalline Solar Panels (p-Si)

Amorphous Silicon Solar Panels (A-SI)

Cadmium telluride photovoltaics (CdTe)

Copper indium gallium selenide modules (CIGS)

Copper indium selenide modules (CIS)

Concentrated PV Cell (CVP)

Biohybrid Solar modules

Monofacial modules

Bifacial modules

Modules without encapsulant

Silicon heterojunction solar modules tunnel oxide passivated contact solar modules (TOPCON)

passivated emitter and rear contact solar modules (PERC)

Tandem-junction Solar Panels

Perovskite-based Solar Panels

Glass-Backsheet Solar Panels

Glass-Glass Solar Panels

Building-Integrated Solar Panels

Polymer-Based Solar Panels

Solar Roof Tiles

Solar Roof Shingles

Solar modules can last decades, with some degradation in performance over a module's lifetime. Also, solar modules that have been deployed on residential rooftops and other commercial and utility-scale applications for a number of years, may be decommissioned for a variety of reasons.

For example, (residential, commercial, utility) users of solar panels may desire to exchange their modules for newer, higher performing modules in order to maximize the amount of energy obtained from a solar array.

As more solar modules reach the end of their useful lives and/or are relinquished by their owners, it is desirable to dispose of the panels in an environmentally-friendly and economically-feasible way. Alternatively, it may be desired to refurbish and reuse existing solar modules to prolong their lifetimes and reduce cost.

Once it is determined that a solar module is no longer useful to its owner, e.g.:

the module has reached the end of its current deployment due to non- or underperformance, the module has been damaged in transit, or for other (e.g., economic) reasons, in order to avoid discarding the module into a landfill, the module may either be recycled or refurbished and reused.

Accordingly, to determine whether a solar module should be recycled or refurbished and reused, embodiments may implement one or more of the following processes, alone or in various combinations and sequences.

cleaning;

inspection to determine reusability;

testing;

remove cabling;

remove frames surrounding the panel and/or junction boxes (either manually, or e.g., using an automated deframing machine).

transparent front layers and potentially other layers (e.g., the backsheet) may be removed using a delamination process.

Remaining layers (of, e.g., a laminate) may be shredded. Shredded materials can be separated using one or more processes in order to extract various possible reusable materials therefrom (e.g., valuable commodity metals such as silicon, silver, and/or copper).

Figure 1:
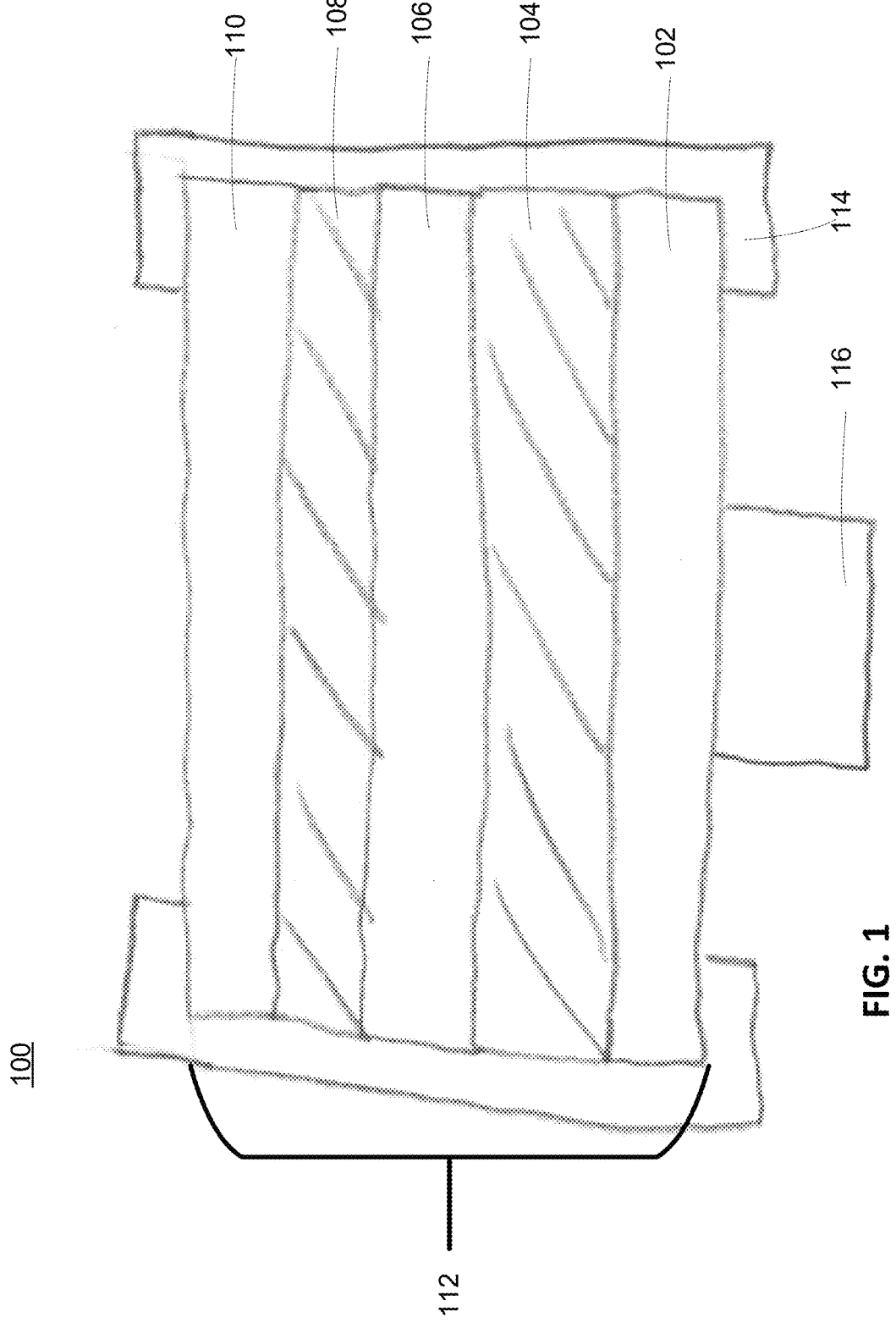
FIG. 1 shows a cross-sectional view of a monofacial solar module according to an example.

Embodiments relate to various techniques that may be employed, alone or in combination, for the recycling and/or refurbishment of solar modules. FIG. 1 shows a cross-sectional view of a monofacial solar module according to an example.

The PV module 100 is made of different layers assembled into the structure shown in FIG. 1. These layers of FIG. 1 are not drawn to scale.

The layers of FIG. 1 can be simplified as:

substrate (backsheet) 102, back encapsulant 104, e.g., Ethylene-vinyl acetate (EVA), silicone, Polyvinyl butyral (PVB), IONOMER, solar cell 106 comprising PV material (including, e.g., but not limited to: doped single crystal, polycrystalline, or amorphous silicon, Group III-V materials) and metallization, front encapsulant 108, transparent front cover sheet 110 (e.g., typically glass). This grouping of layers is referred to as a laminate 112.

It is further noted that bifacial modules also exist. Such bifacial modules may exhibit a structure similar to that of FIG. 1, but have a transparent (e.g., glass) layer instead of a backsheet layer. This allows (e.g., reflected) light to enter the module from the back.

The laminate in FIG. 1 is surrounded by a frame 114. The frame may comprise a stiff metal such as aluminum. Alternatively, a frame material may be plastic, comprising e.g., polycarbonate.

A junction box 116 is also part of the module. The junction box may be potted (more common in newer models) or non-potted (more common in older models). In a the potted PV junction box, the foils coming out of the solar panel are soldered to the diodes in the junction box, and the junction box is potted or filled with a type of sticky material to allow thermal transfer of heat to keep the solder joint in place and prevent it from falling. Fabrication may take longer but creates a better seal.

In the non-potted PV junction box, a clamping mechanism is used to attach the foil to the wires in the junction box. This can involve a faster assembly, but may not be as robust. A module having a potted junction box may be more amenable to recycling or refurbishment.

Figure 1A:
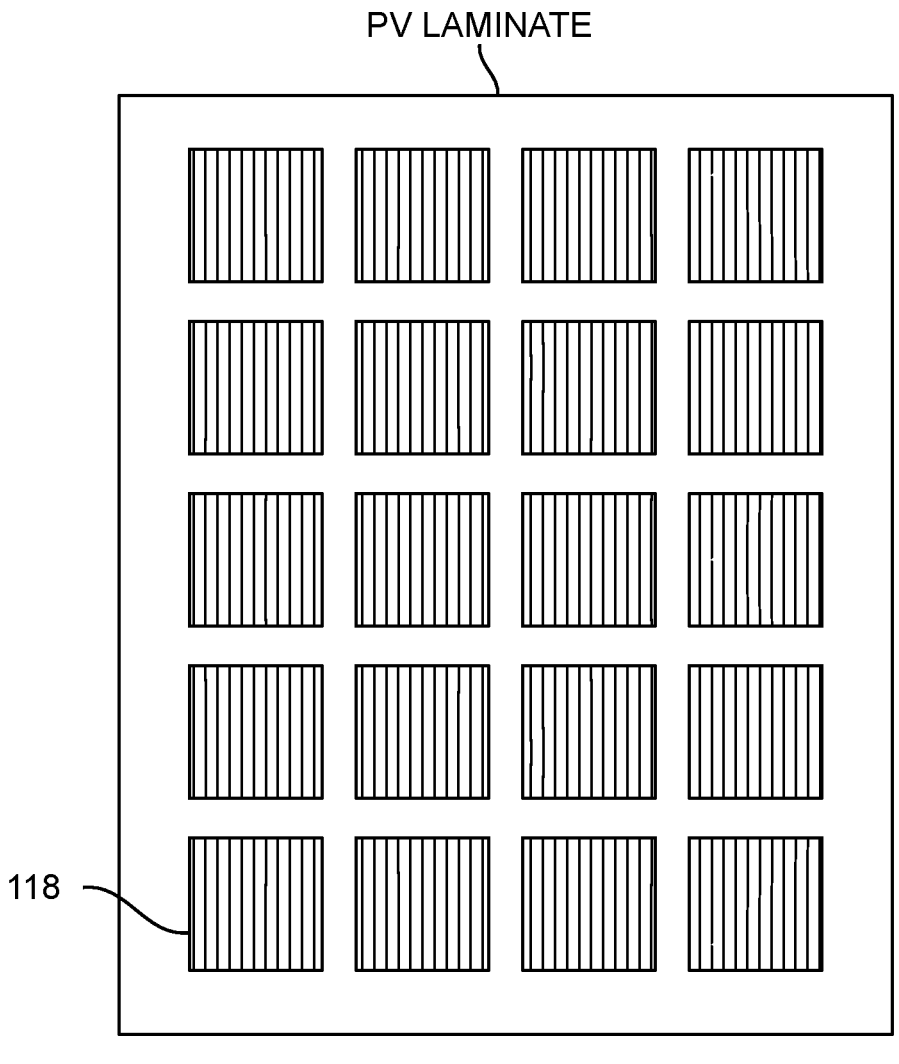
FIG. 1A shows a simplified overhead view of the laminate of a solar module, lacking the frame and the top transparent sheet.

FIG. 1A shows a simplified overhead view of the laminate of a solar module, lacking the frame and the top transparent sheet. FIG. 1A shows solar cells including patterned metallization 118, which may comprise, e.g., a valuable metal such as silver.

Figure 2:
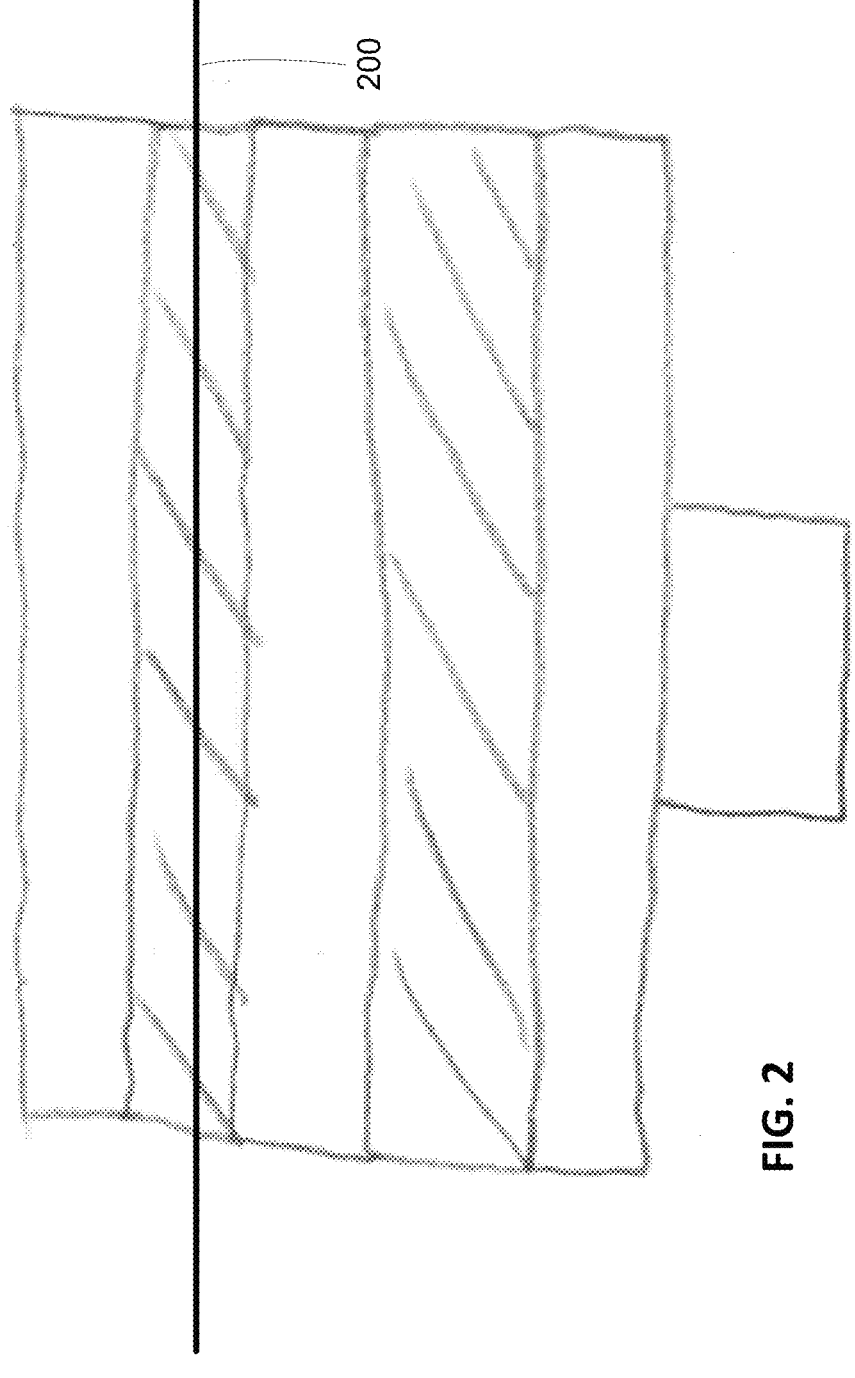
FIG. 2 is a simplified cross-sectional view showing a wire to cut through one or more layers.

Prior to delamination, the frame is removed. Then, as shown in FIG. 2, according to embodiments a thin wire 200 may be used to cut through one or more layers (e.g., front encapsulant, back encapsulant, both front and back encapsulant, backsheet) of the PV laminate.

In some embodiments, the wire may be heated to temperatures of between about 400-600° C. For particular embodiments, this can be achieved by applying a difference of electric potential between the two ends of the wire.

The heated wire can then be pushed through encapsulant layer(s). This effectively separates the laminate into different parts.

According to some embodiments, the heat of the wire effectively degrades ("melts+burns") the encapsulant. In certain embodiments, the wire physically cuts through the encapsulant material.

In particular embodiments, the wire may have a diameter of 0.5 mm or less. Specific embodiments may employ a wire having a diameter of between about 0.2-0.5 mm.

A wire material useful for embodiments, may exhibit high mechanical strength and sufficiently low electrical conductivity to generate the heat by resistive heating. Examples of possible candidates for wire materials include but are not limited to:

NiCr alloy, stainless steel,

FeCrAl alloy, aluminum (such as 6000 series), copper coated materials.

Delamination according to particular embodiments, may separate the top (e.g., glass) sheet and the rest of the layers. For some embodiments, the delamination process could separate the laminate into three (3) distinct layers: the top sheet (e.g., glass), the solar cell, and the backsheet. For some embodiments, the delamination process could separate the laminate from the backsheet.

Embodiments may determine where pressure is specifically to be applied as part of a delamination process. For example, embodiments may determine a location as to where the wire should engage with the module.

One possible approach to targeting a location of application of the hot wire may be based upon optics. That is, differences in refraction index of cover sheet (e.g., glass) versus encapsulant (e.g., EVA) may be detected.

Another possible approach to wire targeting may be based upon X-Ray Diffraction (DRX). One example could detect an amorphous structure of a glass cover sheet, versus a semi-crystalline structure of EVA.

One possible approach to wire targeting, is to have the wire push against the glass as to create an angle between 5-450 from the panel inclination. Exerting a force down on the wire can serve to keep the panel flat during processing.

For some embodiments, data relating to factors including but not limited to:

panel size, panel model, and/or panel weight.

could be stored in a database that is in turn referenced to output a thickness of the glass. The laminate could be aligned relating the model, manufacturer, and/or year to a database.

Use of a hot wire for delamination according to embodiments may offer one or more benefits. A first benefit is low energy use to heat up the wire. Another possible benefit is precise application of the wire to the laminate, resulting in clean separation of the layers.

Delamination efforts may employ approaches in alternative to, or in combination with, hot wire delamination. Particular embodiments may apply rotating member(s) against surface(s) of a used solar module to effect delamination. In certain embodiments, the rotating member may comprise a straight router bit, which may be applied under computer control. Successive application of rotating member(s) at different heights, may afford the collection of different materials. According to one particular embodiment, a rotating router bit may be applied first against a polymer backsheet, and then at a different height against other materials comprising metals and PV material such as crystalline silicon. Collection of resulting fractions produced by delamination at different heights, can produce material (e.g., metals, silicon) of relatively high purity and suitable for reuse.

Figure 3:
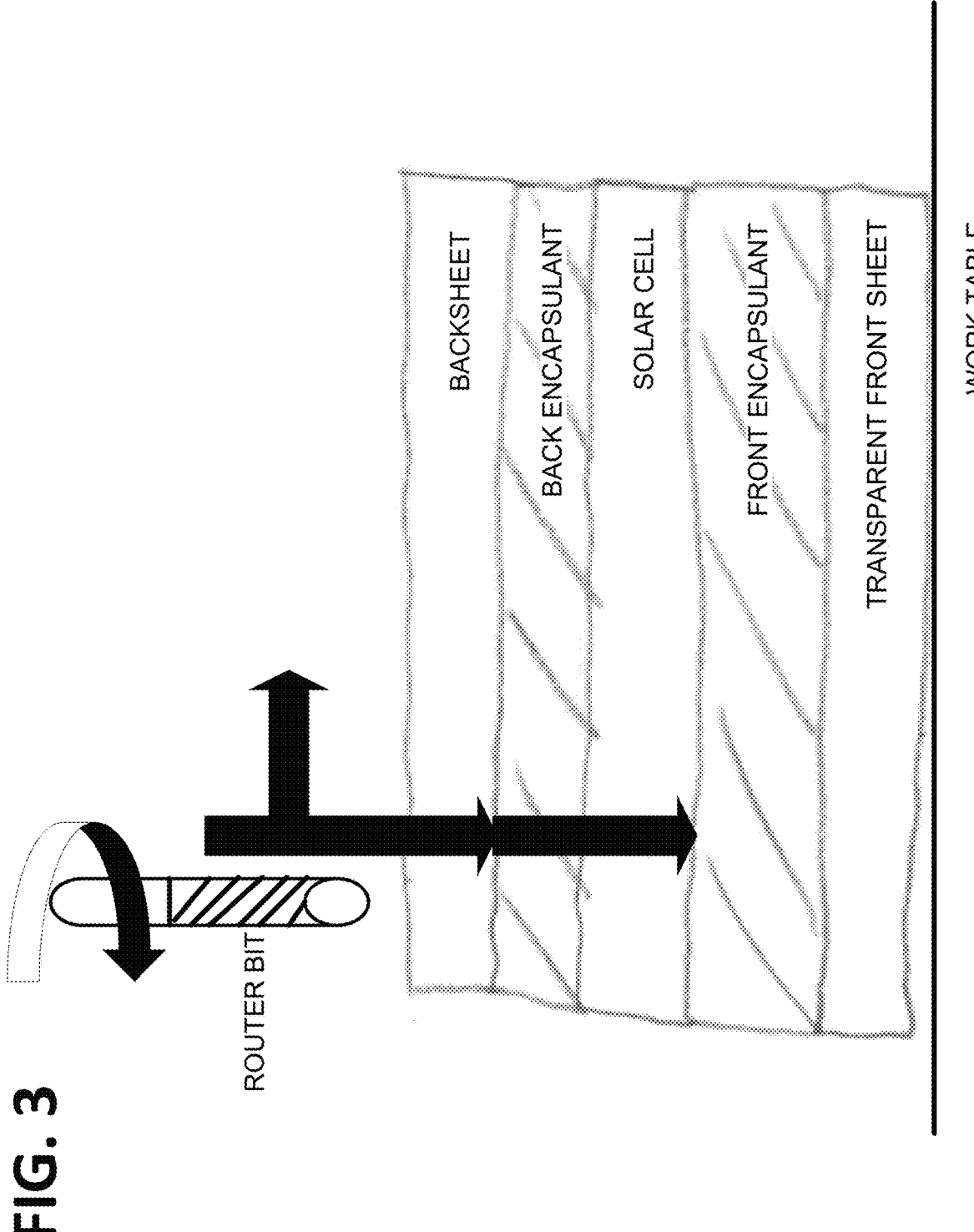
FIG. 3 shows a simplified view of delamination according to one embodiment.
Figure 4:
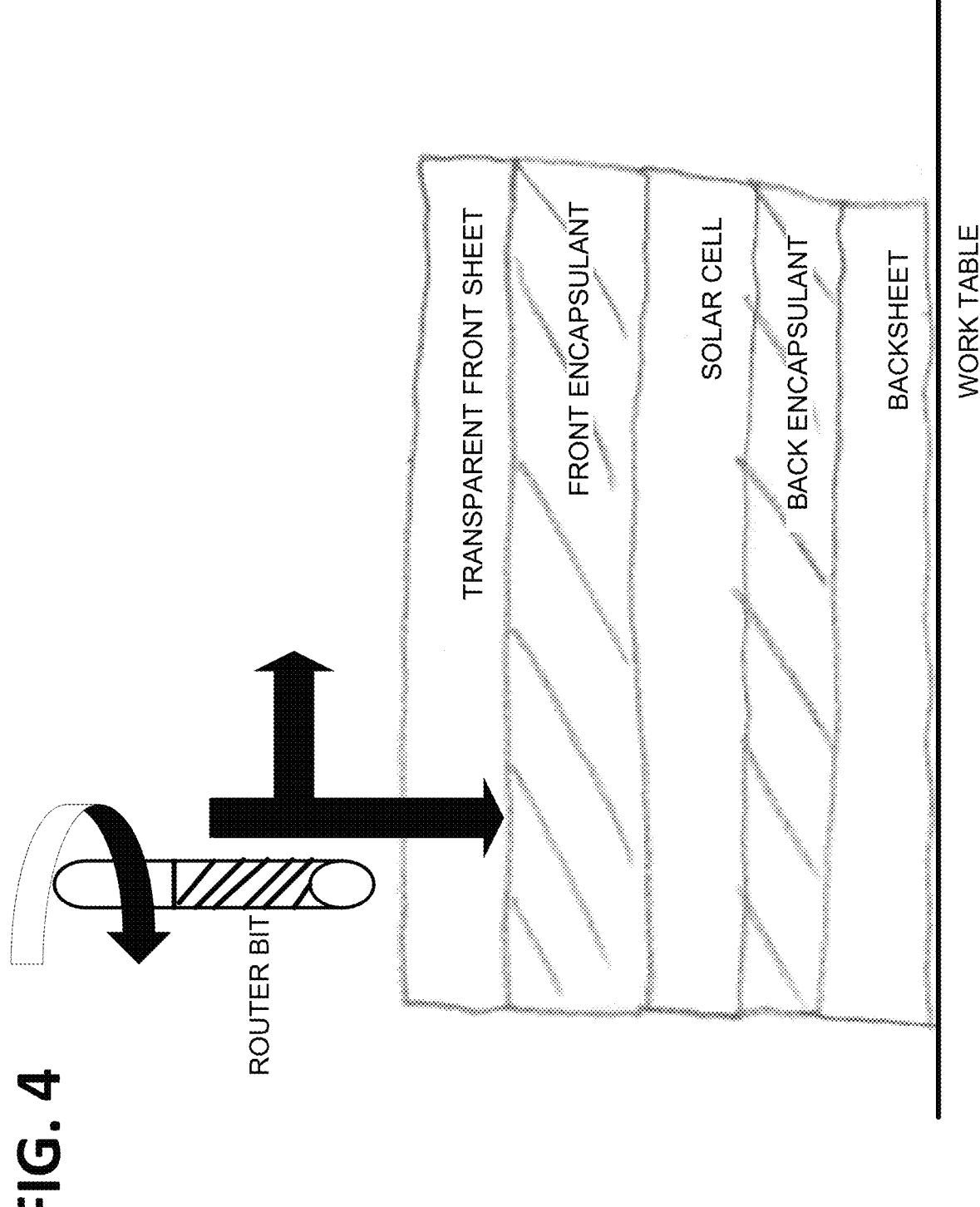
FIG. 4 shows an embodiment applying a rotating member first against the transparent cover sheet of a used solar module.

FIG. 3 shows a simplified view according to a specific embodiment. However, embodiments are not limited to this particular approach. For example, alternatives could instead apply a rotating member first against the transparent cover sheet of a used solar module. This is shown in FIG. 4.

Example 1

The first example was performed automatically using a computer-controlled tool. In particular, the following materials were used for the first test:

| | |
|---|---|
| Workpiece | Cracked PV c-Si laminated with dimensions of 220 × 250 mm, from Komaes Solar |
| Tool | Computer numerical control (CNC) router of 3 axles, model Sigma 600 from Tecnodrill of Novo Hamburgo, Brazil |
| Tool Attachment | Set of clamps with "T" nuts, high hex nuts, step clamps, and step wedges |
| Tool Attachment | Straight router bit (8 mm) from Indaco |

The machining programming was performed in the Edge-cam software, with the following parameters were applied:

machining area of 200×150 mm;

thinning function;

travel rate to the next roughing line with a lateral increment of 60% of the diameter;

horizontal milling cutter travel speed 800 mm/min;

vertical milling cutter travel speed 200 mm/min;

spindle rotation speed 5000 rpm;

the tip was lowered at every 0.1 mm to define the heights of each layer.

The clamping structure aligned the PV laminate surface, keeping the height uniform and allowing delamination of a laminate with cracked glass. The delamination heights were:

fraction #1: height=0.4 mm to remove the backsheet;

fraction #2: height=0.7 mm to remove the EVA;

fraction #3: height=1.1 mm to separate the silicon (in powder form) and the copper strips (in fragments), leaving the tempered glass.

In this first example, the use of CNC milling, and an 8 mm straight edge tip, allowed separation of these three layers. This enhanced the purity of the recovered materials, with few silicon losses.

Figure 5:
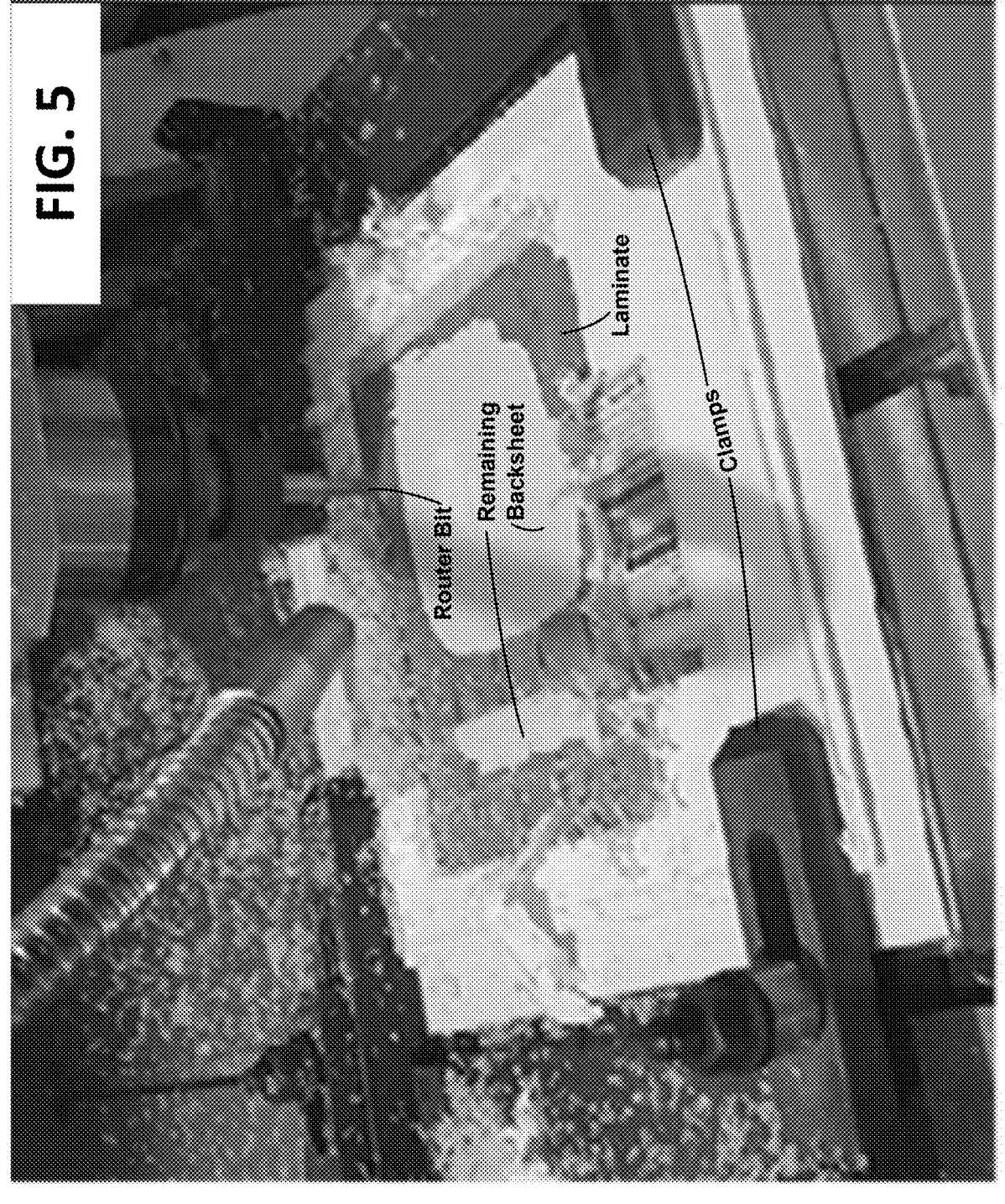
FIG. 5 shows a simplified view of the delamination according to a $2^{nd}$ example.
Figures 5A, 6:
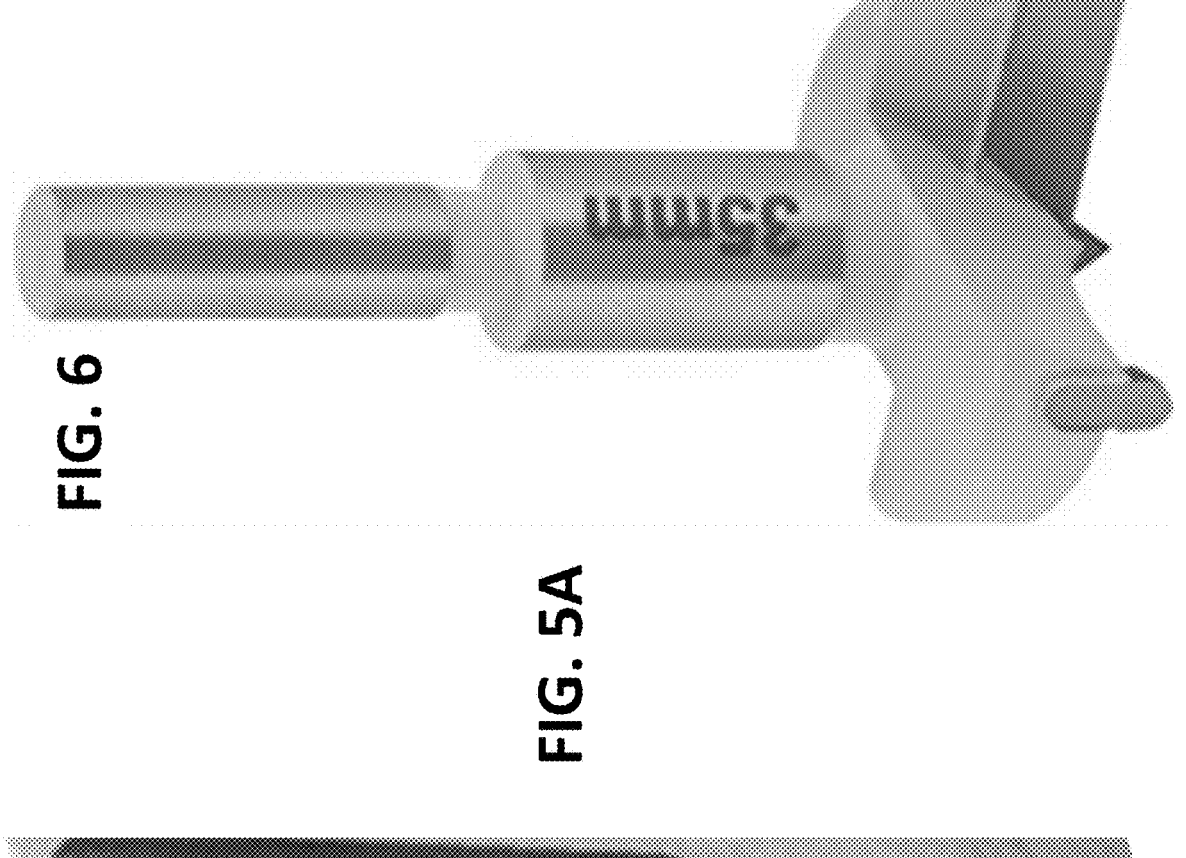
FIG. 5A shows a straight router bit.
FIG. 6 shows a cutter for cylinder hinge.

Automating fraction collection can enhance purity. FIG. 5 shows a simplified view of the delamination according to this second example. FIG. 5A shows the straight router bit.

Example 2

This second example also used an automated approach, but with a different attachment. In particular, the following materials were used for the second test.

| | |
|---|---|
| Workpiece | New PV c-Si laminated with dimensions of 220 × 250 mm, from Komaes Solar |
| Tool | Computer numerical control (CNC) router of 3 axles, model Sigma 600 from Tecnodrill |
| Tool Attachment | Set of clamps with "T" nuts, high hex nuts, step clamps, and step wedges |
| Tool Attachment | Cutter for cylinder hinge, 35 mm diameter, with 2 teeth of widia, Vonder Vdo1631, available from the Widia Product Group |

Delamination heights obtained in the first example, were applied in this second example. The second example tested a router bit with a diameter larger than 8 mm to reduce operation time. However, the cutter for cylinder hinge with 35 mm diameter (FIG. 6) was of the cup saw type with 2 teeth. The center tip of the cutter tool was removed to have the same height at the cutting points.

The machining programming was performed in the Edge-cam software, and the following parameters were applied:

machining area of 200×250 cm;

thinning function;

horizontal milling cutter travel speed 2000 mm/min;

spindle rotation speed 2000 rpm.

With the above parameters adopted, for this third example the removal time for each layer was 1 min and 7 sec, for a 20×25 cm area. This corresponded to a delamination speed of 17.9 min/m$^2$.

Embodiments are not limited to the particular examples described above. According to alternative embodiments, delamination could take place in whole or in part from the glass side (rather than, or in addition to, from the backsheet side).

Also, wire delamination could be used in combination with other delamination approaches as have been described herein.

A straight router bit having a diameter other than 8 mm (e.g., Example 1), could be employed alone or in combination with a cup saw type with teeth (e.g., Example 2).

It is also noted that the heights for each layer of material in a laminate may vary as the machining area increases. To reduce loss of silicon to a polymeric fraction, two layers may be removed:

(1) the backsheet with EVA, and (2) silicon and copper ribbons (possibly including some EVA).

It is emphasized that the approaches as described above may be utilized alone, or in various combinations in order to effect the recycling and/or refurbishment of solar modules.

Embodiments may use multiple tips. Those tips can have different diameter sizes, and/or have surfaces that are straight or toothed.

Various types of equipment can be used for mechanical delamination. Examples include but are not limited to:

Computer Numerical Control (CNC) drill, handheld drill, wood grinder, wood rectifier, chisel, non-automated drill.

In certain embodiments, a delamination system can be associated with suction system for debris or collection of material of interest, such as polymers, silicon, metals, glass. Such collected material could be in the form of powder or fragments.

For some embodiments, the collection of the delaminated material(s) can be accomplished done by suction. Electrical/electromagnetic properties and gravity can also be exploited. After collection, sieving systems can be employed in order to purify the material(s) of interest.

What is claimed is:

1. A method comprising:

applying a rotating member at a first height against a first surface of a used solar module;

collecting a first fraction of material;

applying the rotating member at a second height against the first surface of the used solar module; and then collecting a second fraction of material, wherein the rotating member comprises a drill.

2. A method as in claim 1 wherein the first surface comprises a backsheet.

3. A method as in claim 2 wherein the backsheet comprises a polymer.

4. A method as in claim 3 wherein the polymer comprises Ethylene-vinyl acetate (EVA), silicone, and/or Polyvinyl butyral (PVB).

5. A method as in claim 1 wherein the second fraction comprises crystalline silicon.

6. A method as in claim 1 wherein the second fraction comprises Cadmium.

7. A method as in claim 1 wherein the second fraction comprises perovskite.

8. A method as in claim 1 wherein the first surface comprises a transparent sheet.

9. A method as in claim 8 wherein the used solar module is bifacial and the transparent sheet is a back side.

10. A method as in claim 8 wherein the transparent sheet is glass.

11. A method as in claim 1 wherein the second fraction comprises metal.

12. A method as in claim 11 wherein the metal comprises silver.

13. A method as in claim 11 wherein the metal comprises copper.

14. A method as in claim 1 wherein the rotating member comprises steel.

15. A method as in claim 1 wherein the rotating member comprises diamond.

16. A method as in claim 1 wherein the drill is automated.

17. A method as in claim 1 wherein the first height and the second height are controlled by a computer.

18. A method as in claim 1 further comprising performing delamination with a wire.

\* \* \* \* \*